US008228696B2

(12) United States Patent
Uno

(10) Patent No.: US 8,228,696 B2
(45) Date of Patent: Jul. 24, 2012

(54) POWER FACTOR CORRECTION CONVERTER

(75) Inventor: Yoshiyuki Uno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/106,908

(22) Filed: May 13, 2011

(65) Prior Publication Data

US 2011/0211377 A1   Sep. 1, 2011

Related U.S. Application Data

(63) Continuation of application No. PCT/JP2009/059749, filed on May 28, 2009.

(30) Foreign Application Priority Data

Nov. 25, 2008   (JP) .................................. 2008-299061

(51) Int. Cl.
G05F 1/70   (2006.01)

(52) U.S. Cl. .......................................... 363/89; 323/222

(58) Field of Classification Search .................. 323/222; 363/89
See application file for complete search history.

(56) References Cited

U.S. PATENT DOCUMENTS

| 4,683,529 | A | * | 7/1987 | Bucher, II | 363/44 |
| 5,134,355 | A | * | 7/1992 | Hastings | 323/211 |
| 5,146,398 | A | * | 9/1992 | Vila-Masot et al. | 363/89 |
| 5,391,976 | A | | 2/1995 | Farrington et al. | |
| 5,614,812 | A | * | 3/1997 | Wagoner | 323/222 |
| 5,738,525 | A | * | 4/1998 | Davies | 434/219 |
| 5,742,151 | A | * | 4/1998 | Hwang | 323/222 |
| 5,757,635 | A | * | 5/1998 | Seong | 363/89 |
| 5,804,950 | A | * | 9/1998 | Hwang et al. | 323/222 |
| 5,818,707 | A | | 10/1998 | Seong et al. | |
| 5,867,379 | A | * | 2/1999 | Maksimovic et al. | 363/89 |
| 6,388,429 | B1 | * | 5/2002 | Mao | 323/222 |
| 6,469,917 | B1 | * | 10/2002 | Ben-Yaakov | 363/44 |
| 6,882,551 | B2 | * | 4/2005 | Shimada et al. | 363/79 |
| 7,990,740 | B1 | * | 8/2011 | Notohamiprodjo et al. | 363/59 |

(Continued)

FOREIGN PATENT DOCUMENTS

JP   07-177746 A   7/1995

(Continued)

OTHER PUBLICATIONS

Official Communication issued in International Patent Application No. PCT/JP2009/059749, mailed on Aug. 25, 2009.

*Primary Examiner* — Jeffrey Sterrett
(74) *Attorney, Agent, or Firm* — Keating & Bennett, LLP

(57) ABSTRACT

A PFC converter that rapidly and highly accurately detects current passing through an inductor so as to properly improve harmonics and the power factor as well as to correctly detect the operation state. In the PFC converter, a first current value is obtained by performing sampling at the middle portion of the on-period of a switching element, and a second current value is obtained by performing sampling at the middle portion of the off-period thereof. If the first current value and the second current value are equal or substantially equal to each other, then it is determined that the operation state is a continuous current mode, and if the first current value and the second current value are not equal or substantially equal to each other, then it is determined that the operation state is a discontinuous current mode.

3 Claims, 7 Drawing Sheets

U.S. PATENT DOCUMENTS

| | | | |
|---|---|---|---|
| 8,040,114 B2 * | 10/2011 | Saint-Pierre | 323/222 |
| 8,111,050 B2 * | 2/2012 | Sutardja et al. | 323/207 |
| 8,130,522 B2 * | 3/2012 | Maksimovic | 363/89 |
| 8,179,703 B2 * | 5/2012 | Uno | 363/44 |
| 2010/0091523 A1 * | 4/2010 | Uno et al. | 363/20 |
| 2010/0128503 A1 * | 5/2010 | Liu et al. | 363/89 |
| 2011/0211375 A1 * | 9/2011 | Uno | 363/74 |
| 2011/0211377 A1 * | 9/2011 | Uno | 363/124 |
| 2011/0216558 A1 * | 9/2011 | Uno | 363/21.12 |
| 2012/0057382 A1 * | 3/2012 | Uno | 363/89 |

FOREIGN PATENT DOCUMENTS

| | | |
|---|---|---|
| JP | 09-140144 A | 5/1997 |
| JP | 2000-014143 A | 1/2000 |
| JP | 2002-203988 A | 7/2002 |
| JP | 2004-229369 A | 8/2004 |
| JP | 2004-282958 A | 10/2004 |
| JP | 2006-087261 A | 3/2006 |

* cited by examiner

POWER FACTOR CORRECTION CONVERTER

BACKGROUND OF THE INVENTION

1. Field of the Invention

The present invention relates to an AC-DC converter that receives an alternating-current power supply and outputs a direct-current voltage and, in particular, to a power factor correction (PFC) converter that improves the power factor.

2. Description of the Related Art

Japan and Europe, for example, have enforced harmonic current regulations classified according to the application, the input power, and other factors. To address these regulations, circuits called PFC converters have been added to the power supplies of general home electrical appliances to which the regulations apply so as to suppress harmonic current.

A general switching power supply device using a commercial alternating-current power supply as an input power supply rectifies and smoothes the commercial alternating-current power supply to convert it into a direct-current voltage and then switches the direct-current voltage in a DC-DC converter. Thus, the input current is discontinuous and significantly deviates from a sine wave. This results in harmonic current.

To suppress such harmonic current, a PFC converter is disposed between a full-wave rectifier circuit and a smoothing circuit that includes a smoothing capacitor.

This PFC converter includes a chopping circuit and operates so that the input current waveform is similar to the input voltage waveform, that is, the input current waveform has a sinusoidal shape in phase with the input voltage waveform. Thus, harmonic current is suppressed to a certain level or below.

Hereafter, an example configuration of a PFC converter shown in Japanese Unexamined Patent Application Publication No. 2004-282958 will be described with reference to FIG. 1. In a power-factor improvement circuit shown in FIG. 1, a series circuit that includes an inductor L1, a switching element Q1, which is a MOSFET, and a current detection resistor R is connected to both output terminals of a diode bridge B1, which rectifies the alternating-current power supply voltage of an alternating-current input power supply vac. A series circuit that includes a diode D1 and a smoothing capacitor C1 is connected to both end portions of the switching element Q1, and a load RL is connected to both end portions of the smoothing capacitor C1. The switching element Q1 is turned on or off under the PWM control of a control circuit 10. The current detection resistor R detects input current passing through the diode bridge B1.

The control circuit 10 includes an error amplifier 111, a multiplier 112, an error amplifier 113, a voltage control oscillator (VCO) 115, and a pulse width modulation (PWM) comparator 116.

The error amplifier 111 obtains the error between the voltage of the smoothing capacitor C1 and a reference voltage E1. The multiplier 112 multiplies the error voltage signal by the voltage rectified by the diode bridge B1. The error amplifier 113 generates an error between the result of the multiplication performed by the multiplier 112 and the current signal passing through the diode bridge B1 and outputs the error to the PWM comparator 116.

The VCO 115 generates a chopping signal with a frequency corresponding to the rectified voltage value of the alternating-current power supply voltage.

The negative terminal of the PWM comparator 116 receives the chopping signal from the VCO 115, and the positive terminal thereof receives the signal from the error amplifier 113. That is, the PWM comparator 116 provides to the switching element Q1 a duty pulse corresponding to the current passing through the diode bridge B1 and the output voltage. This duty pulse is a pulse width control signal that successively compensates for variations in the alternating-current power supply voltage and the direct-current load voltage in a certain period.

Due to this configuration, control is performed so that the current waveform of the alternating-current power supply is similar to and in phase with the voltage waveform of the alternating-current power supply. Thus, harmonics and the power factor are improved.

On the other hand, Japanese Unexamined Patent Application Publication No. 7-177746 is disclosed as a PFC converter that performs digital control. In addition, with digital control, current passing through the inductor is detected, and the switching element is switched under PWM control corresponding to the value of the current.

Meanwhile, to properly achieve harmonics suppression and power factor improvement, which are the objectives of PFC converters, rapid and highly accurate detection of the current passing through the inductor is required. To detect the operation state of a PFC converter and to perform a process corresponding to the operation state, rapid and highly accurate detection of the current passing through the inductor is also required.

Conventional PFC converters that perform switching control using an analog circuit, such as the PFC converter of Japanese Unexamined Patent Application Publication No. 2004-282958, cannot sufficiently rapidly detect the current passing through the inductor. PFC converters that perform digital control, such as the PFC converter of Japanese Unexamined Patent Application Publication No. 7-177746, must originally perform a large amount of operation processing, and the response speed and accuracy have a tradeoff relationship. For these reasons, there is a limit to the amount by which responsiveness can be improved while maintaining accuracy.

SUMMARY OF THE INVENTION

To overcome the problems described above, preferred embodiments of the present invention provide a PFC converter that is capable of detecting current passing through an inductor rapidly and highly accurately to improve harmonics and the power factor as well as to detect the operation state correctly.

A PFC converter according to a preferred embodiment of the present invention preferably includes a rectifier circuit arranged to rectify an alternating-current voltage received from an alternating-current input power supply, a series circuit that is connected to a trailing portion of the rectifier circuit and includes an inductor and a switching element, a rectifying and smoothing circuit connected in parallel with the switching element, a switching control circuit arranged to on/off control the switching element so that input current received from the alternating-current input power supply has a shape similar to a shape of the alternating-current voltage, a current detection circuit arranged to detect current passing through the switching element or the inductor in the on-period of the switching element, a first current detection circuit arranged to sample a detection signal of the current passing through the switching element or the inductor at middle portion of the on-period of the switching element and to detect the sampled detection signal as a first current value, a second current detection circuit arranged to sample a detection signal of the current passing through the inductor at a middle portion of the off-period of the switching element and to detect the sampled detection signal as a second current value, and a current increase/decrease state detection circuit arranged to detect a current increase/decrease state by comparing the first and second current values.

The first current value is preferably the average value of the current passing through the switching element and the inductor in the on-period of the switching element. The second current value is preferably the average value of the current passing through the inductor in the off-period of the switching element. Accordingly, this two-point sampling enables detection of the increase/decrease state of the current passing through the inductor and rapid performance of control corresponding to the increase/decrease state.

Preferably, when the first and second current values are equal or substantially equal to each other, the current increase/decrease state detection circuit determines that the operation state is a continuous current mode, and when the second current value is less than the first current value, the current increase/decrease state detection circuit determines that the operation state is a discontinuous current mode.

This configuration enables a rapid determination as to whether the operation state is in a continuous current mode or in a discontinuous current mode with an extremely small amount of operation processing, as well as rapidly performing control corresponding to the mode.

Preferably, the current increase/decrease state circuit makes a determination as to whether the operation state is a steady state or a transient state, based on a variation between the first current values in different periods or a variation between the second current values in different periods.

This configuration enables a rapid determination as to whether the operation state is a steady state or a transient state with an extremely small amount of operation processing, as well as rapidly performing control corresponding to the state.

According to various preferred embodiments of the present invention, it is possible to detect the increase/decrease state of the current passing through the inductor based on the first and second current values, as well as to rapidly perform control corresponding to the increase/decrease state.

Further, since determination as to whether the operation state is in a continuous current mode or in a discontinuous current mode is made based on the first and second current values, it is possible to rapidly determine whether the operation state is in a continuous current mode or in a discontinuous current mode with an extremely small amount of operation processing, as well as to rapidly perform control corresponding to the mode.

Furthermore, since determination as to whether the operation state is a steady state or a transient state is made based on the first and second current values, it is possible to rapidly determine whether the operation state is a steady state or a transient state with an extremely small amount of operation processing, as well as to rapidly perform control corresponding to the mode.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A PFC converter according to preferred embodiments of the present invention will be described with reference to FIGS. 2 to 8B.

Figure 1:
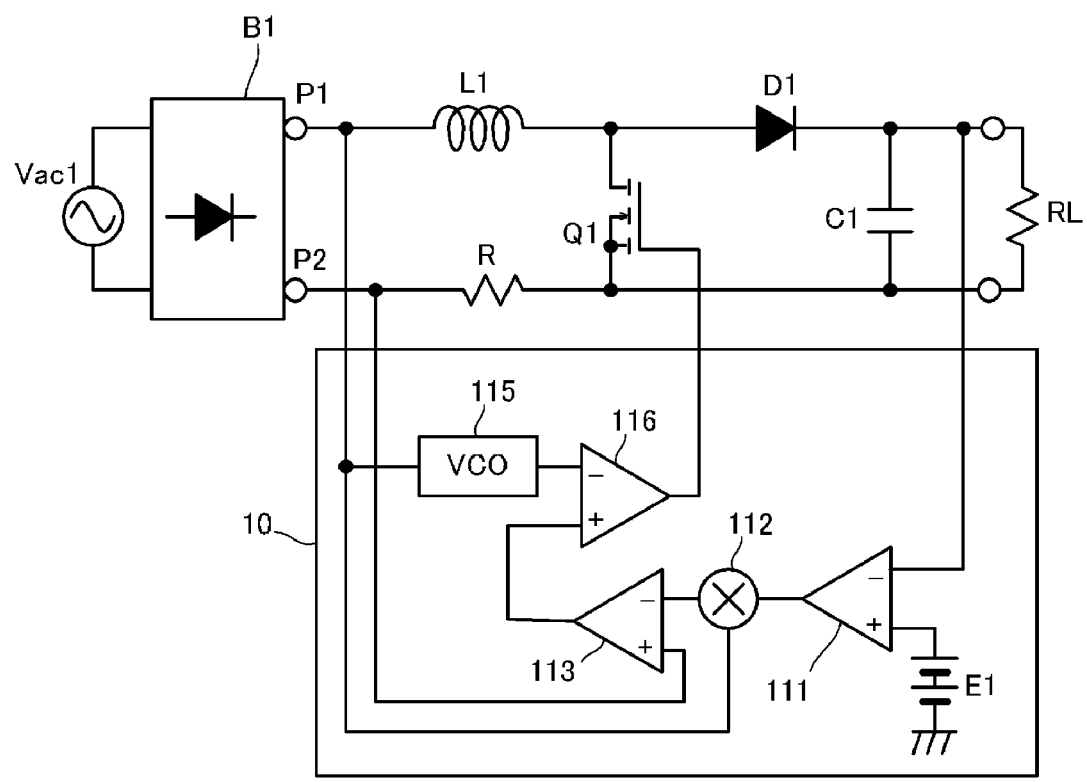
FIG. 1 is a circuit diagram of a known PFC converter.
Figure 2:
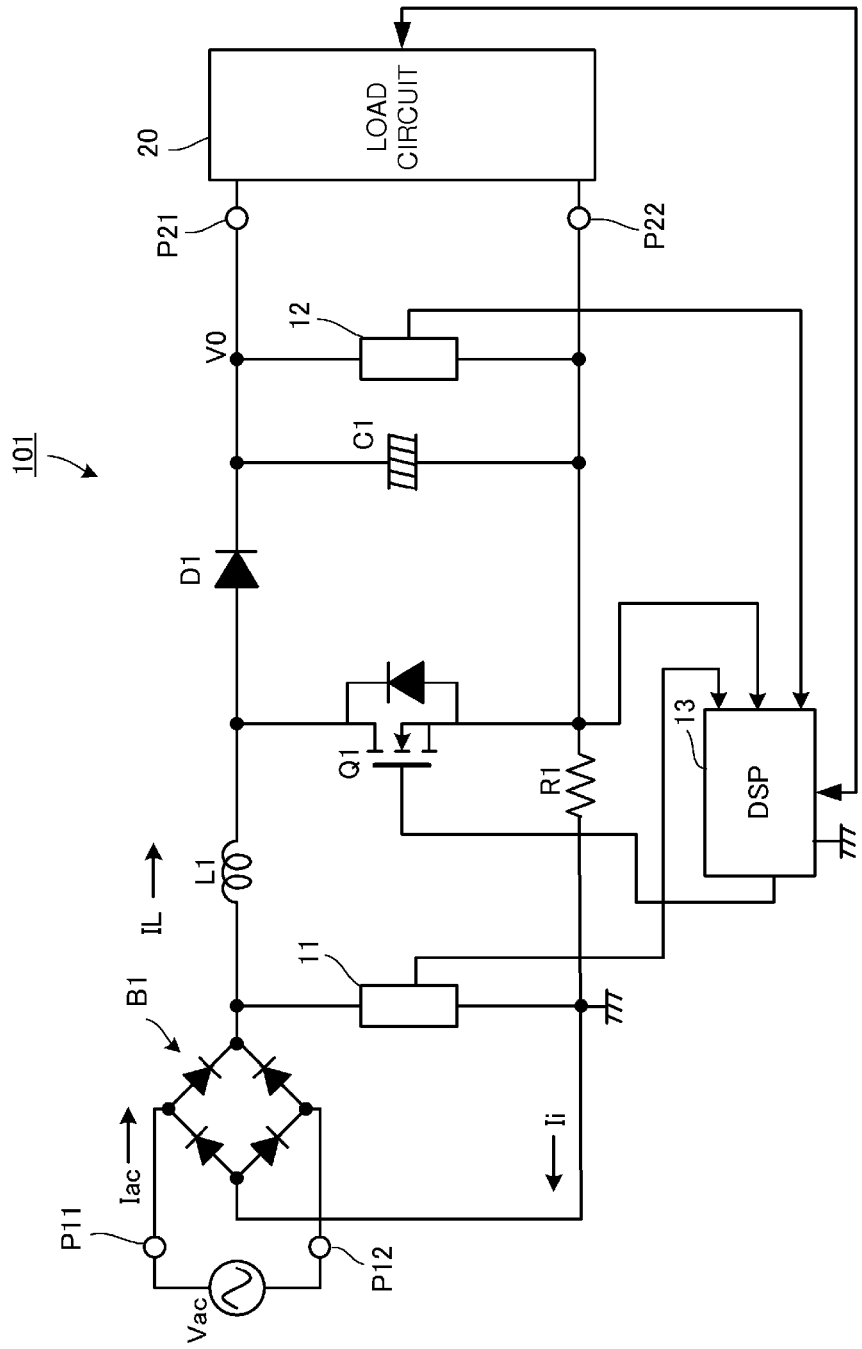
FIG. 2 is a circuit diagram of a PFC converter according to a preferred embodiment of the present invention.

FIG. 2 is a circuit diagram of a PFC converter 101 according to a preferred embodiment of the present invention. In FIG. 2, numerals P11 and P12 are the input ports of the PFC converter 101, and numerals P21 and P22 are the output ports thereof. An alternating-current input power supply vac, which is preferably a commercial alternating-current power supply, for example, is input into the input port P11 and P12, and a load circuit 20 is connected to the output ports P21 and P22.

The load circuit 20 is preferably, for example, a circuit including a DC-DC converter and an electronic device that receives power supply therefrom.

A diode bridge B1, which is a rectifier circuit that full-wave rectifies the alternating-current voltage of the alternating-current input power supply vac, is disposed in the input stage of the PFC converter 101. A series circuit that preferably includes an inductor L1, a switching element Q1, and a current detection resistor R1 is connected to an output of the diode bridge B1. A rectifying and smoothing circuit that preferably includes a diode D1 and a smoothing capacitor C1 is connected in parallel with both end portions of the switching element Q1. The inductor L1, the switching element Q1, the diode D1, and the smoothing capacitor C1 define a step-up chopper circuit.

An input voltage detection circuit 11 is disposed between both output terminals of the diode bridge B1. An output voltage detection circuit 12 is disposed between the output ports P21 and P22. A digital signal processing circuit 13 preferably includes a DSP and controls the PFC converter 101 by digital signal processing. Specifically, the digital signal processing circuit 13 receives an output signal of the input voltage detection circuit 11 and detects the voltage phase of the alternating-current input power supply using a method to be described later. The digital signal processing circuit 13 also receives an output signal of the output voltage detection circuit 12 so as to detect the output voltage. The digital signal processing circuit 13 also turns on or off the switching element Q1 at a predetermined switching frequency.

A unit that performs a process related to a switching control signal to be provided to the switching element Q1 in the digital signal processing circuit 13 corresponds to a "switching control circuit" according to preferred embodiments of the present invention. The current detection resistor R1 corresponds to a "current detection circuit" according to preferred embodiments of the present invention. A unit that performs a process related to current detection in the digital signal processing circuit 13 corresponds to a "first current detection circuit" and a "second current detection circuit" according to preferred embodiments of the present invention.

The digital signal processing circuit 13 also preferably includes ports through which it communicates with the load circuit 20, and, for example, communicates data or receives or outputs signals, always transmits the converter state to the load circuit (electronic device), transmits the input voltage, the output voltage, and the output current thereto, and receives the load state therefrom to be incorporated into switching control.

Figure 3A:
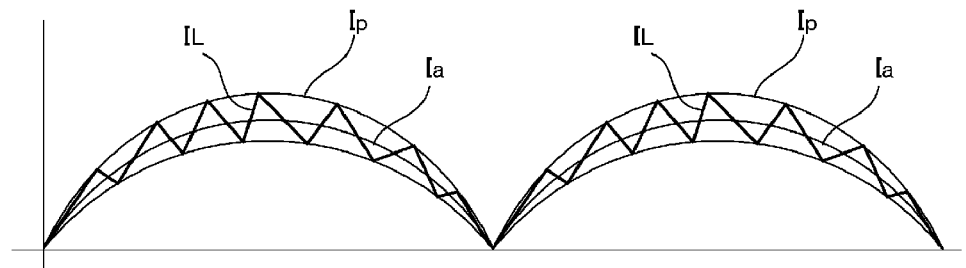
FIGS. 3A to 3C are diagrams showing control methods performed by a digital signal processing circuit on a PFC converter.
Figure 3B:
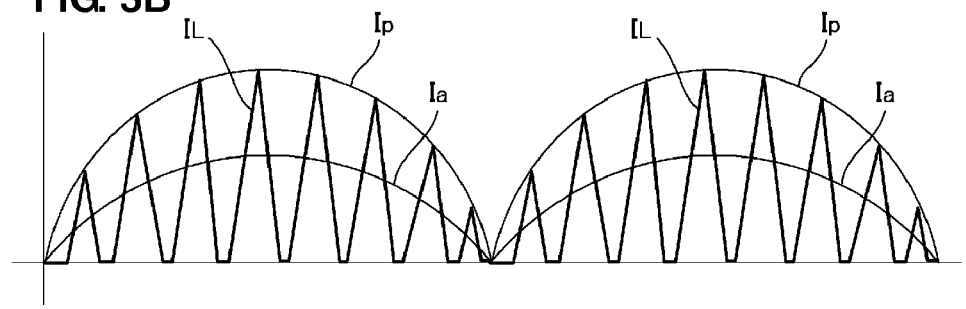
Figure 3C:
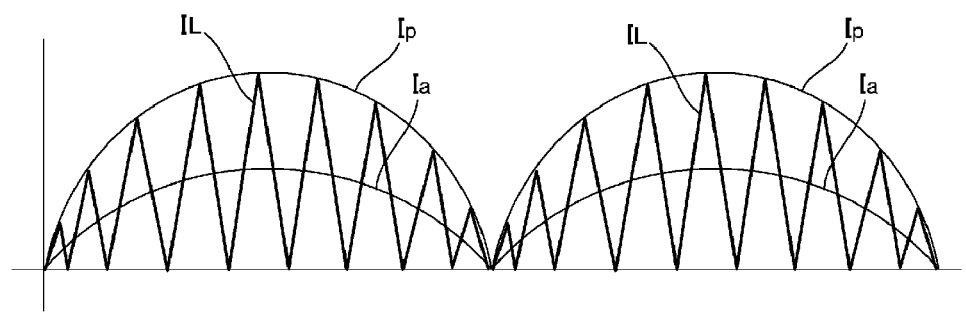

FIGS. 3A to 3C are diagrams showing control methods performed by the digital signal processing circuit 13 on the PFC converter 101. FIGS. 3A, 3B, and 3C are current waveforms in one period of the alternating-current power supply. A waveform IL is the waveform of current passing through the inductor L1 in the PFC converter 101 shown in FIG. 2. Ip is an envelope of the peak value of the current (peak current), and Ia is an envelope of the average value of the current (average current). For convenience of illustration, the diagrams represent a case in which the switching frequency of the PFC converter 101 is extremely reduced, that is, the diagrams represent a frequency such that the waveform of the current passing through the inductor L1 appears to be a chopping wave.

FIG. 3A is a waveform diagram in a continuous current mode, FIG. 3B is a waveform diagram in a discontinuous current mode, and FIG. 3C is a waveform diagram in a critical current mode. As shown, in the continuous current mode shown in FIG. 3A, the current passing through the inductor L1 of the PFC converter 101 does not become zero except in the vicinity of the zero-cross of the alternating-current input power supply. In the discontinuous current mode shown in FIG. 3B, a period during which the current value is zero occurs each time excitation energy is accumulated in the inductor L1 of the PFC converter 101 or released therefrom. In the critical mode shown in FIG. 3C, the current value becomes zero each time excitation energy is accumulated in the inductor L1 of the PFC converter 101 or released therefrom, and states in which the current value is zero do not occur continuously.

Figure 4A:
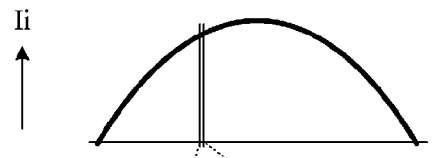
FIGS. 4A to 4C are waveform diagrams of the voltage or current of the PFC converter in a switching period in a state in which control is being performed in continuous current mode.
Figure 4B:
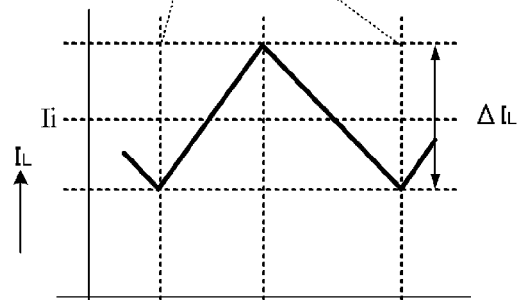

FIGS. 4A and 4B are waveform diagrams of the voltage or current of the PFC converter 101 in a switching period in a state in which control is performed in the continuous current mode.

The switching control circuit 13 performs switching control so that the average value of current input into the PFC converter 101, that is, the average value of current passing through the inductor L1 has a shape similar to the full-wave rectified waveform. The passage of the input current having a shape similar to that of the input voltage in this manner prevents harmonics and improves the power factor.

Figure 4C:
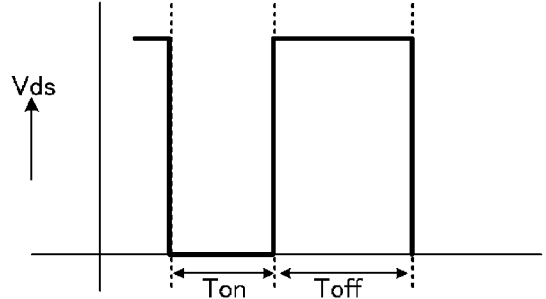

FIG. 4A is a current waveform of the average value Ii of the current passing through the inductor L1 in a semi-period of the commercial power supply frequency; FIG. 4B is a waveform diagram of current IL passing through the inductor L1 in a switching period in which a portion of the time axis is expanded; and FIG. 4C is a waveform diagram of a drain-source voltage vds of the switching element Q1.

During the on-period Ton of the switching element Q1, the current IL passes through the inductor L1 and rises at an inclination determined by the voltage between both end portions of the inductor L1 and the inductance of the inductor L1. Subsequently, during the off-period Toff of the switching element Q1, the current IL falls at an inclination determined by the voltage between both end portions of the inductor L1 and the inductance of the inductor L1. As shown, the current IL passing through the inductor L1 varies in the switching period by the width of current ripple $\Delta IL$.

Figure 5:
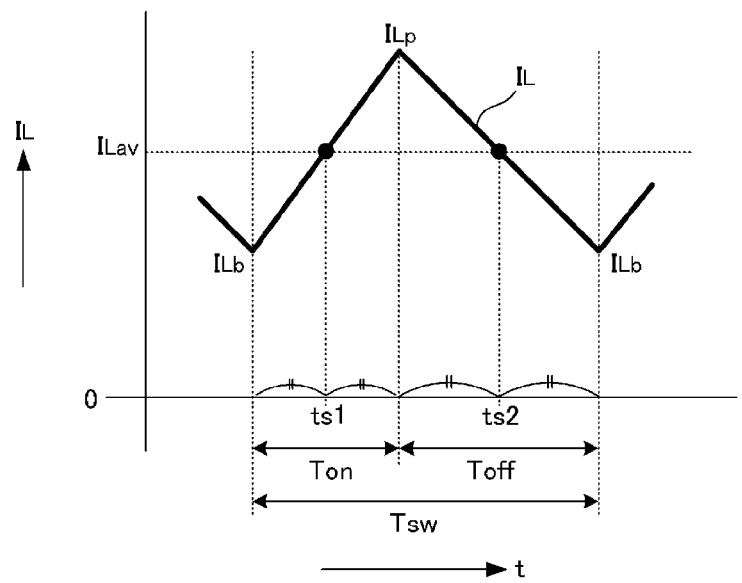
FIG. 5 is a diagram showing a method for obtaining the average value of current passing through an inductor in order to perform average current control in continuous current mode.

FIG. 5 is a diagram showing a method for obtaining the average value of the current passing through the inductor L1 in order to perform average current control in continuous current mode.

If the current value (peak value) passing through the inductor L1 at the time when the switching element Q1 is turned on is represented by ILp and the current value (minimum value) passing through the inductor L1 at the time when the switching element Q1 is turned off is represented by ILb, the average value of the current (average current) passing through the inductor L1 in the on-period Ton of the switching element Q1 is represented by the following relationship.

$$ILav = (ILp + ILb)/2 \quad (1)$$

On the other hand, the current passing through the inductor L1 in the off-period Toff of the switching element Q1 linearly decreases, so that the current value of the inductor L1 at the middle portion of the off-period Toff of the switching element Q1 is equal or substantially equal to the above-mentioned average current value ILav.

For this reason, a voltage drop due to the resistor R1 at the middle portion of the on-period Ton of the switching element Q1 is sampled. This sampling value is a value proportional to the average current value ILav of the current passing through the inductor L1 in the on-period Ton of the switching element Q1. Further, a voltage drop due to the current detection resistor R1 at the middle portion of the off-period Toff of the switching element Q1 is sampled. This sampling value is a value proportional to the average current value ILav of the current passing through the inductor L1 in the off-period Toff of the switching element Q1.

Since a switching control signal to be provided to the gate of the switching element Q1 is generated by the digital signal processing circuit 13, the middle portion ts1 of the on-period Ton and the middle portion ts2 of the off-period Toff are used (controlled) by the digital signal processing circuit 13. Accordingly, a voltage drop due to the current detection resistor R1 can be sampled at the above-mentioned timings, for example, without having to receive a timing signal from the outside.

Next, details of a first process performed by a "current increase/decrease state detection circuit" of the digital signal processing circuit 13 shown in FIG. 2 will be described with reference to FIGS. 6A and 6B.

Figure 6A:
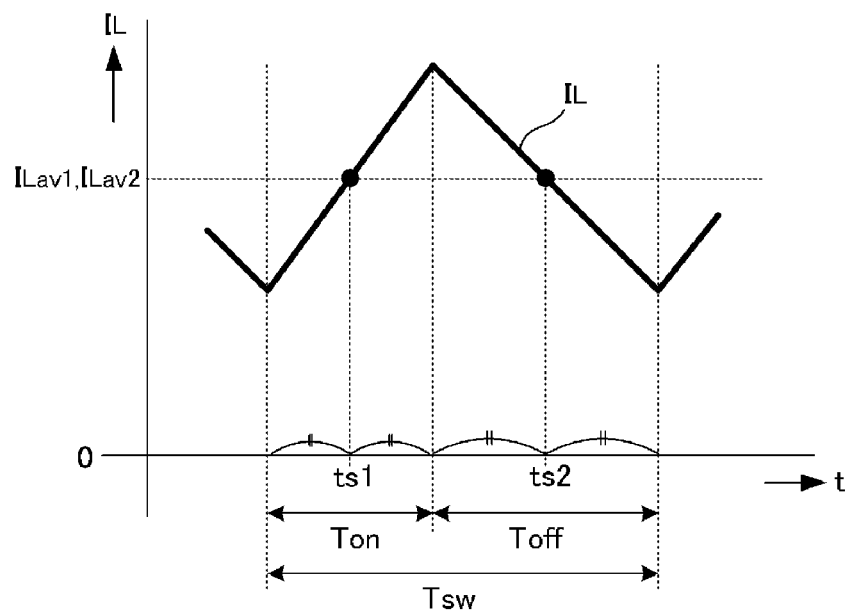
FIG. 6A is a waveform diagram of the inductor current in a continuous current mode.
Figure 6B:
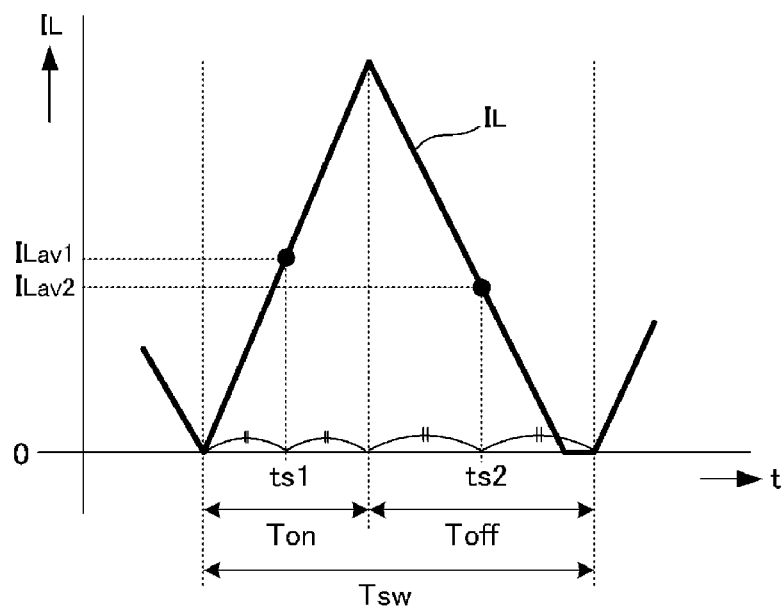
FIG. 6B is a waveform diagram of the inductor current in a discontinuous current mode.

FIG. 6A is a waveform diagram of the inductor current in a continuous current mode, and FIG. 6B is a waveform diagram of the inductor current in a discontinuous current mode.

As described above and as shown in FIG. 6A, in the continuous current mode, the average current value ILav1 of the current passing through the inductor L1 in the on-period Ton of the switching element Q1 and the average current value ILav2 of the current passing through the inductor L1 in the off-period Toff thereof are equal or substantially equal to each other. Accordingly, first, the first current value ILav1 is obtained by performing sampling at the middle portion ts1 of the on-period Ton of the switching element Q1, and the second current value ILav2 is obtained by performing sampling at the middle portion ts2 of the off-period Toff thereof, and if ILav1=ILav2, it is determined that the operation state is in the continuous current mode.

Note that critical current mode is a special state of the continuous current mode and the relationship between the first and second current values is the same as that in continuous current mode. In the description below, "continuous current mode" includes "critical current mode."

On the other hand, in the discontinuous current mode, as shown in FIG. 6B, the average current value ILav1 of the current passing through the inductor L1 in the on-period Ton of the switching element Q1 and the average current value ILav2 of the current passing through the inductor L1 in the off-period Toff thereof differ from each other. Accordingly, first, the first current value ILav1 is obtained by performing sampling at the middle portion ts1 of the on-period Ton of the switching element Q1, and the second current value ILav2 is obtained by performing sampling at the middle portion ts2 of the off-period Toff thereof, and if ILav1≠ILav2, it is determined that the operation state is the discontinuous current mode.

Next, details of a second process performed by the "current increase/decrease state detection circuit" of the digital signal processing circuit 13 shown in FIG. 2 will be described with reference to FIGS. 7A and 7B.

Figure 7A:
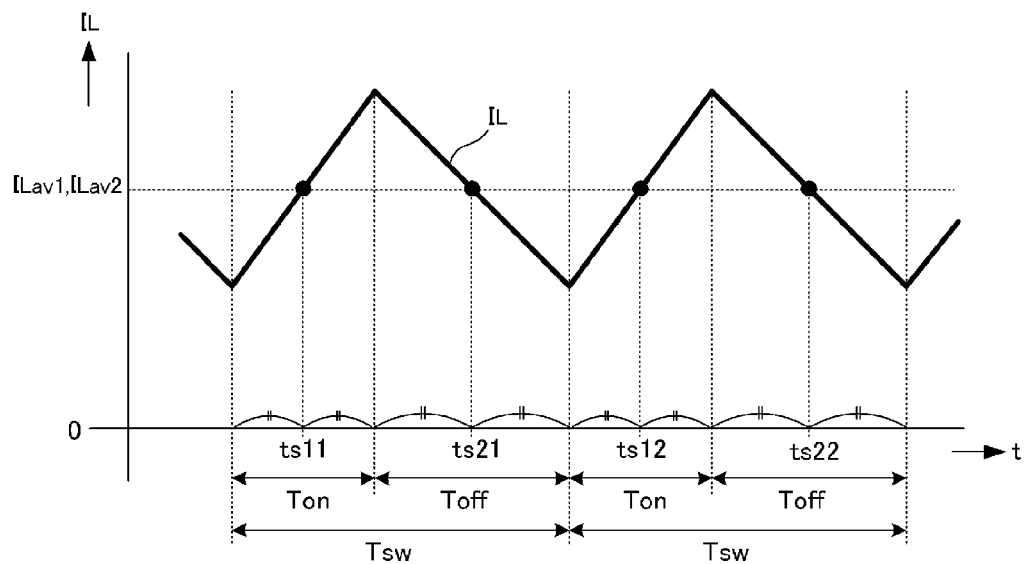
FIG. 7A is a waveform diagram of the inductor current in a continuous current mode and in a steady state.
Figure 7B:
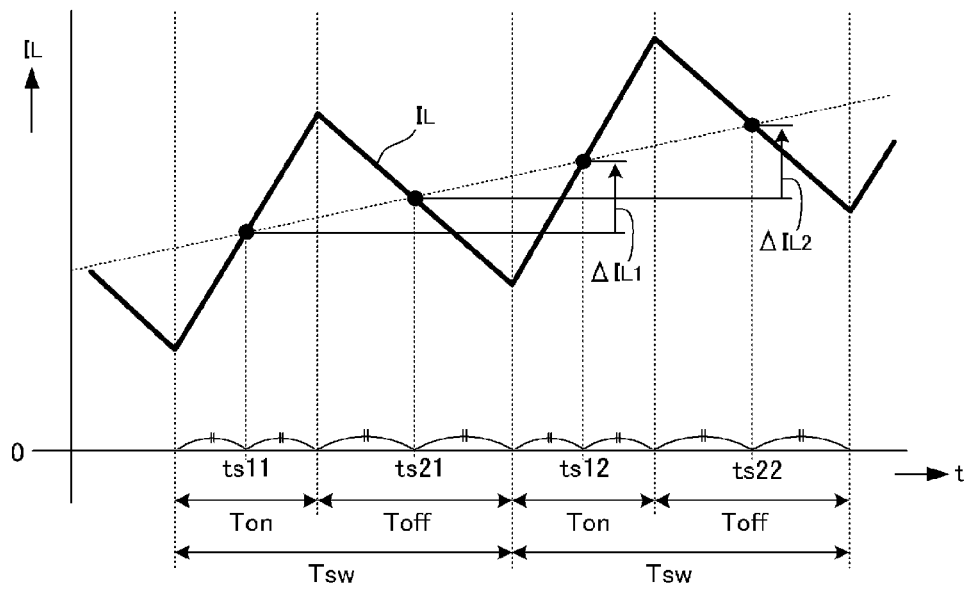
FIG. 7B is a waveform diagram of the inductor current in a continuous current mode and in a transient state.

FIG. 7A is a waveform diagram of the inductor current in a continuous current mode and in a steady state, and FIG. 7B is a waveform diagram of the inductor current in a continuous current mode and in a transient state.

In a steady state, as shown in FIG. 7A, the average current of the current passing through the inductor L1 in the on-period Ton of the switching element Q1 and the average current of the current passing through the inductor L1 in the off-period Toff thereof are equal or substantially equal to each other in any switching period. Accordingly, the first current value ILav1 is obtained multiple times by performing sampling at the middle portion (t11, t12, ...) of the on-period Ton of the switching element Q1 in different periods, and the second current value is obtained by performing sampling at the middle portion (ts21, ts22, ...) of the off-period Toff of the switching element Q1 in the different periods. If the first current value and the second current value at the multiple timings are equal or substantially equal to each other, it is determined that the operation state is the discontinuous current mode and a steady state.

On the other hand, in a transient state, such as the time when the input power supply voltage begins to be input, as shown in FIG. 7B, a comparison between the average currents of the currents passing through the inductor L1 in the on-periods Ton of the switching element Q1 in different switching periods reveals that there is a variation between the average currents. A comparison between the average currents of the currents passing through the inductor L1 in the off-periods Toff of the switching element Q1 also reveals that there is a variation between the average currents.

As in the example shown in FIG. 7B, a comparison between the adjacent switching periods reveals that the average current of the current passing through the inductor L1 in the on-period Ton of the switching element Q1 has increased by ΔIL1. The average current of the current passing through the inductor L1 in the off-period Toff of the switching element Q1 has also increased by ΔIL2.

Accordingly, the first current value is obtained multiple times by performing sampling at the middle portion (t11, t12, ...) of the on-period Ton of the switching element Q1 in different periods, the first current values are compared with each other, and if there is a variation between the current values, it is determined that the operation state is a transient state. Alternatively, the second current value is obtained multiple times by performing sampling at the middle portion (ts21, ts22, ...) of the off-period Toff of the switching element Q1 in different periods, the second current values are compared with each other, and if there is a variation between the current values, it is determined that the operation state is a transient state.

Next, details of a third process performed by the "current increase/decrease state detection circuit" of the digital signal processing circuit 13 shown in FIG. 2 will be described with reference to FIGS. 8A and 8B.

Figure 8A:
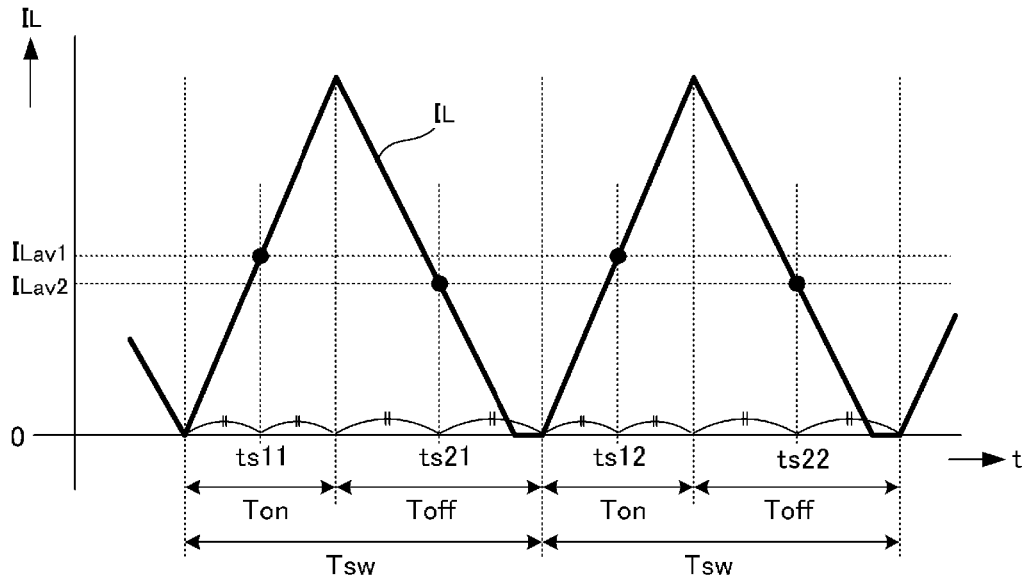
FIG. 8A is a waveform diagram of the inductor current in a discontinuous current mode and in a steady state.
Figure 8B:
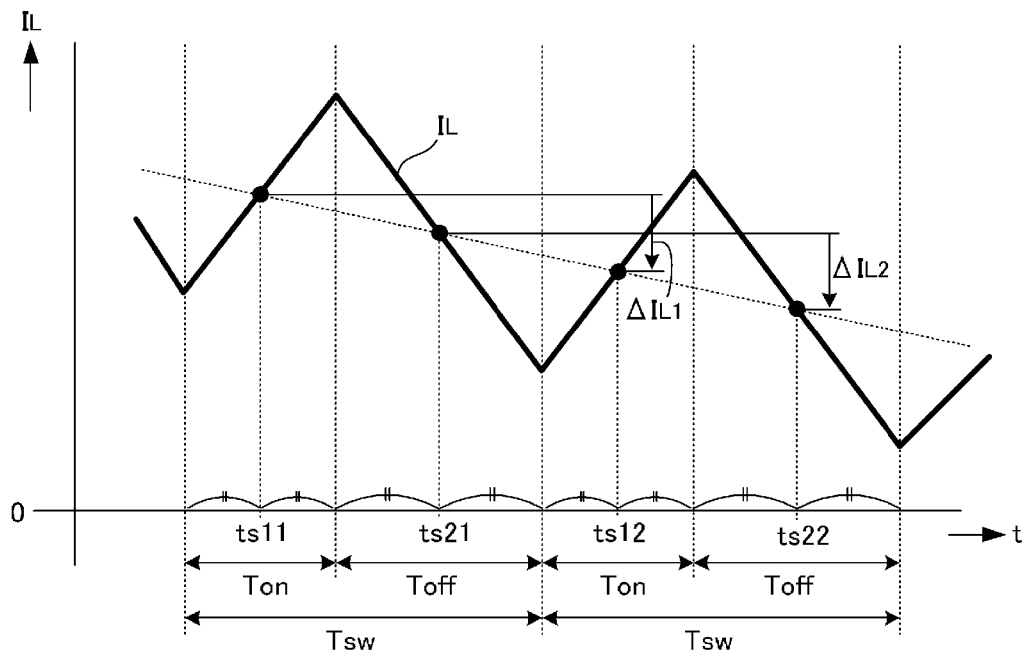
FIG. 8B is a waveform diagram of the inductor current in a continuous current mode and in a transient state.

FIG. 8A is a waveform diagram of the inductor current in a discontinuous current mode and in a steady state, and FIG. 8B is a waveform diagram of the inductor current in a continuous current mode and in a transient state.

In a discontinuous current mode, as shown in FIG. 8A, the average current value ILav1 of the current passing through the inductor L1 in the on-period Ton of the switching element Q1 and the average current value ILav2 of the current passing through the inductor L1 in the off-period Toff thereof differ from each other. Further, in a steady state, the average current value ILav1 of the current passing through the inductor L1 in the on-period Ton of the switching element Q1 is constant through different switching periods. Similarly, the average current value ILav2 of the current passing through the inductor L1 in the off-period Toff of the switching element Q1 is constant through different switching periods.

Accordingly, first, the first current value is obtained multiple times by performing sampling at the middle portion (t11, t12, ...) in the on-period Ton of the switching element Q1 in different periods, the second current value is obtained multiple times by performing sampling at the middle portion (ts21, ts22, ...) in the off-period Toff of the switching element Q1 in the different periods, the first current values or second current values are compared with each other, and if there is no variation between the current values, it is determined that the operation state is a steady state. If the first current value ILav1 obtained by performing sampling at the middle portion (t11, t12, ...) in the on-period Ton of the switching element Q1 and the second current value ILav2 obtained by performing sampling at the middle portion (ts21, ts22, ...) in the off-period Toff thereof are different values, it is determined that the operation state is the discontinuous current mode.

On the other hand, in a continuous current mode and in a transient state toward current decrease, as shown in FIG. 8B, the average current of the current passing through the inductor L1 in the off-period Toff of the switching element Q1 is less than the average current of the current passing through the inductor L1 in the on-period Ton thereof. This variation in average current in one period appears in the same or substantially the same manner as shown in FIG. 8A. However, a comparison between the average currents of the currents passing through the inductor L1 in the on-periods Ton of the switching element Q1 in different switching periods reveals that there is a variation between the average currents as shown by ΔIL1. A comparison between the average currents of the currents passing through the inductor L1 in the off-periods Toff of the switching element Q1 also reveals that there is a variation between the average currents as shown by ΔIL2.

Accordingly, by making the above-mentioned determination as to whether the operation state in is a continuous current mode or in a discontinuous current mode, as well as making a determination as to whether or not the operation state is a transient state, a determination is made as to whether the operation state is a discontinuous current mode and a steady state, or a continuous current mode and a transient state.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power factor correction converter comprising:
   a rectifier circuit arranged to rectify an alternating-current voltage received from an alternating-current input power supply;
   a series circuit connected to a trailing portion of the rectifier circuit and including an inductor and a switching element;
   a rectifying and smoothing circuit connected in parallel with the switching element;
   a switching control circuit arranged to on/off control the switching element so that input current received from the alternating-current input power supply has a shape similar to a shape of the alternating-current voltage;
   a current detection circuit arranged to detect current passing through the switching element or the inductor in the on-period of the switching element;
   a first current detection circuit arranged to sample a detection signal of the current passing through the switching element or the inductor at a middle portion of an on-period of the switching element and to detect the sampled detection signal as a first current value;
   a second current detection circuit arranged to sample a detection signal of the current passing through the inductor at a middle portion of an off-period of the switching element and to detect the sampled detection signal as a second current value; and
   a current increase/decrease state detection circuit arranged to detect a current increase/decrease state by comparing the first and second current values.

2. The power factor correction converter according to claim 1, wherein when the first and second current values are equal or substantially equal to each other, the current increase/decrease state detection circuit determines that the operation state is a continuous current mode, and when the second current value is less than the first current value, the current increase/decrease state detection circuit determines that the operation state is a discontinuous current mode.

3. The power factor correction converter according to claim 1, wherein the current increase/decrease state detection circuit is arranged to determine whether the operation state is a steady state or a transient state based on a variation between the first current values in different periods or a variation between the second current values in different periods.

* * * * *